350-314 SR
4/5/77 XR 4,016,413

United States Patent [19] [11] 4,016,413
Bramley [45] Apr. 5, 1977

[54] OPTOELECTRONIC MEANS FOR ONE-DIMENSIONAL INTEGRAL TRANSFORMS OF TWO DIMENSIONAL INFORMATION

[75] Inventor: Jenny Bramley, Falls Church, Va.

[73] Assignee: The United States of America as represented by the Secretary of the Army, Washington, D.C.

[22] Filed: Dec. 4, 1975

[21] Appl. No.: 637,784

Related U.S. Application Data

[63] Continuation of Ser. No. 456,394, March 29, 1974, abandoned.

[52] U.S. Cl. .............................. 235/181; 324/77 C; 324/77 K; 350/314

[51] Int. Cl.² ....................... G06G 9/00; G02B 5/20

[58] Field of Search ........... 324/77 C, 77 CS, 77 K; 235/181; 315/11; 350/314; 358/44

[56] References Cited

UNITED STATES PATENTS

| | | | |
|---|---|---|---|
| 2,774,814 | 12/1956 | Perilhou et al. | 358/44 |
| 3,204,248 | 8/1965 | Alexander | 235/181 |
| 3,286,083 | 11/1966 | Nielsen | 235/61.11 |
| 3,358,149 | 12/1967 | Preikschat | 235/181 |
| 3,441,724 | 4/1969 | Taylor, Jr. | 235/181 |
| 3,486,016 | 12/1969 | Faiss | 235/181 |
| 3,768,907 | 10/1973 | Williams | 235/181 |

*Primary Examiner*—Felix D. Gruber
*Attorney, Agent, or Firm*—William G. Gapcynski; Lawrence A. Neureither; Frank R. Agovino

[57] ABSTRACT

The invention concerns an analog TV-type process and apparatus for rapid processing of pictorial information. A transparency is rapidly scanned by a line of light source, scanning of which is controlled by conventional electronic means. The light output is applied to an image converter tube and the output thereof applied in line by line sequence to a transmissive plate. The plate has parallel strips with transmittivities determined by the operation to be performed, such as biased sines or cosines for a Fourier transform. A line of the picture on the transparency is projected successively on all the transmissive strips. The total amount of light output of each strip of the plate is applied to a photomultiplier tube. The coefficients of the Fourier transform are obtained from the difference between the photomultiplier output after illumination of a line of the transmissive plate and a stored signal which specifies the bias level.

14 Claims, 4 Drawing Figures

OPTOELECTRONIC MEANS FOR ONE-DIMENSIONAL INTEGRAL TRANSFORMS OF TWO DIMENSIONAL INFORMATION

The invention described herein may be manufactured and used by or for the Government for governmental purposes without the payment of any royalty thereon.

This is a continuation, of application Ser. No. 456,394, filed Mar. 29, 1974 and now abandoned.

BACKGROUND OF THE INVENTION

While digital computers are capable of extremely rapid operation, delays are inherent in the input and output functions pertaining to picture processing, namely the digitizing of pictorial information, introducing it into a digital computer, and obtaining a suitable output after processing has been completed. These delays are compounded by the need for piecewise operation since no inner computer memory is capable of storing intensity data pertaining $1 \times 10^6$ picture points, which constitute only a moderate sized picture.

To obviate these difficulties, parallel or near-parallel optoelectronic analog TV-type processing techniques have been devised as in the instant invention. The input information is imparted to a light beam by conventional optical means but is processed optelectronically, and the output is electronic. The storage image tube, invented by Knoll and described in U.S. Pat. No. 2,856,559 (June 1952) was developed primarily by ITT and described in the ITT Technical Note 103 by E. H. Ebehardt, Sept. 21 (1967). This tube has been a preferred device for analog central processor. Its principle of operation has been analyzed by Hawkins and Munsey as described in Proc. IEEE 55 1084 (1967) and Journal Optical Soc. 57, 914 (1967), and a system successfully using it in specialized applications has been developed by Goodyear under the trade mark of CORRELATRON described in a paper presented at NAECON Conference, May 6–8 (1968) in Dayton, Ohio. The storage image tube can be used for a number of simple processing operations, not complex ones, such as Fourier Transforms. For general purpose image processing it is advantageous to employ systems for parallel processing, based on the use of display devices, suitable for complex operations as well as faster and more precise. This invention describes a system which accomplishes this objective and is of special interest in application to topographic sciences.

THE FIELD OF THE INVENTION

The field of the invention concerns the rapid processing of pictorial information by analog TV-type processing techniques, such as obtaining one-dimensional integral transforms.

DESCRIPTION OF THE PRIOR ART

Prior art devices and methods for rapidly processing pictorial information employing digital computers as in U.S. Pat. No. 3,544,775 to Bergland et al have inherent limitations caused by delays in digitizing pictorial information and limitations on capability of storing intensity data permitting only a moderate sized picture to be stored. Further, digital processing of such information involves a large number of complex arithmetic operations to calculate the desired coefficients of the Fourier transform of a picture. While the algorithm of Cooley and Tukey reduced the number of parallel arithmetic operations and permitted economies in systems using digital computers, the procedure was still laborious. The method and system of the instant invention realizes radical economies in determining for a Fourier transform by employing an optoelectronic means using parallel processing for Fourier coefficients eliminating the need for any algorithms of the Cooley, Tukey type. It is a non-digital method for obtaining the sign as well as the absolute value of a coefficient in the Fourier transform of a picture. Optical methods for processing information by using Fourier transforms are discussed in "Some Methods of Signal Processing Using Optical Techniques" by D. C. Cooper in the Radio Electronic Engineer for July 1966, pages 5–13. None of the methods described involve the method and apparatus as in the instant invention of obtaining transform coefficients of a Fourier or other integral transform by imparting a line of a transparency successively on all of a series of parallel transmissive strips on a plate, applying the total amount of light transmitted through each such strip to a photomultiplier tube, and obtaining the coefficients of the Fourier or other integral transform from the difference between the photomultiplier output after illumination of a line of the transmissive plate and a stored signal, which specifies the bias level.

SUMMARY OF THE INVENTION

The invention concerns a method and apparatus for analog TV-type rapid processing of pictorial information. The invention specifically embodies a transmission plate composed of parallel strips, each strip having adjacent elements of varying densities, the transmittivities of which correspond to biased sine and cosine values for a Fourier transform, or other biased integral kernel values for other transforms. This Fourier Transform is but one example of a numerical calculation of a variety of other integral transforms. For example, Mellin transform, Laplace transform and Hankel transform may be obtained. It should be understood that the structure of the transmissive plate should correspond to the integral transform used. The transmission plate is embodied in a system in which a line of light illuminates lines of a transparency bearing image information individually or in a selected order with the light output passing through an image converter tube and imparted to the transmission plate in rapid line scanning sequence at rates which are standard for flying spot scanners, with speed limited only by the decay time of the phosphor on the faceplate of the image converter tube. The total amount of light transmitted through each successive strip is focused on a photomultiplier tube. The difference between the photomultiplier output signal after illumination of a selected strip and a stored signal which specifies the bias level yields the coefficients of the Fourier transform or other integral transform. The system of the instant invention allows the correlation (in mathematical terms a correlation of two pictures) process to be accomplished in a single step instead of requiring N successive multiplications as in the case of a conventional serial computer. The method and apparatus of the instant invention uses a fiber optic image converter tube in conjunction with a magnetic deflection system. While illumination of successive lines on the transparency being processed can be accomplished by a combination of mechanical and optical means, this type of equipment is cumbersome, particularly if a high degree of precision is required. Furthermore, the practical speed of operation is limited.

It is a primary object of the invention to provide an extremely fast, direct means for obtaining a one-dimensional integral transform, such as a Fourier transform, of vast amounts of pictorial information.

It is a further object of the invention to provide a rapid processing technique utilizing parallel or near-parallel optoelectronic analog TV-type equipment for processing pictorial information which overcomes delays in the computational problems when computing Fourier and other integral transforms and storage limitations of digital processing of such information.

It is a further object of the invention to provide a method and apparatus for processing pictorial information in which the capability of the information storage equipment is commensurate with the speed of the central processor.

It is another object of the invention to provide a method and apparatus for processing pictorial information which is suitable for a variety of applications and perform a number of operations with only modular adjustments.

It is another object of the invention to provide a method and apparatus for processing pictorial information which is economical and wherein the apparatus is conventional, readily available, state-of-the-art optoelectronic equipment.

It is another object of the invention to provide a method and apparatus for processing pictorial information wherein extremely large storage capability of video type tape storage is utilized.

It is another object of the invention to provide a method and apparatus for processing pictorial information in which the operation is not limited to obtaining Fourier transforms but can be applied to obtaining almost any integral transform using suitable bias levels.

These and other objects will become apparent to those skilled in the art upon reference to the following description in which FIG. 1 is a side view illustrating the arrangement and function of the components;

FIGS. 2 and 3 illustrate two different state of the art embodiments of the line by line scanner employed by the invention;

and FIG. 4 is a planar view of the transmissive plate.

DESCRIPTION OF THE PREFERRED EMBODIMENT

Figure 1:
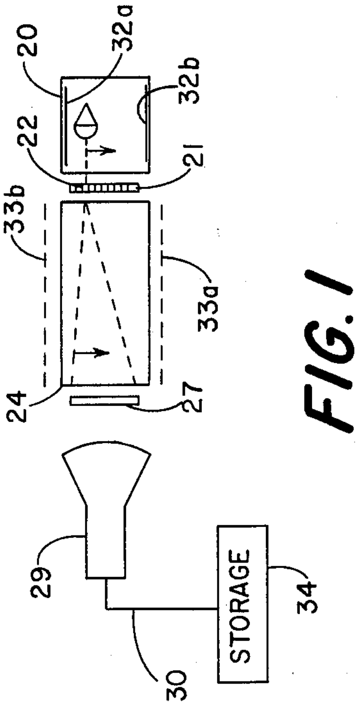

Reference is made to the FIG. 1 wherein a line of light source 20 electronically scans a transparency 21 line by line. The scanning operation is accomplished by TV-type equipment 32*a* and 32*b* which control the deflection of the line of light in a digital mode which allows the time each line is illuminated to be controlled. The light output from each line of light passing through the transparency is applied to an image converter tube 24 having fiber optic faceplates and provided with a magnetic deflection coil 33*a* and 33*b* which scans the image across the output of the tube. A line 22 of the picture on the transparency 21 is placed successively on all the transmissive strips 28 of a transmissive plate 27, called processing plate. Although the drawing figure shows the transparency 21 and the transmissive plate 27 spaced from the image converter tube 24, in practice the transparency and the plate should be positioned so as barely to avoid being in contact with the faceplates of the image converter tube. Fiber optics eliminate the need to use lenses or similar optical equipment. The first strip 28*a* has a density of the material of the transmissive plate and the other parallel strips of the plate 28 have elemental, adjacent variations 31 of transmittivities corresponding to biased sine or cosine Kernel values for Fourier transform or other values specified for other transforms. The process to produce parallel strips having transmittivities of adjacent elemental portions of each strip corresponding to biased sine or cosine needed to obtain a Fourier transform or other unit values specified for other transforms is accomplished by conventional photographic or other appropriate methods. The total amount of light output of each strip of the plate is applied to a photomultiplier tube 29. The light output after scanning of the first strip 28a of the plate 31 serves as the bias value. This bias value is subtracted from the light output after scanning each succeeding strip 28 thereby providing the value of the coefficient for the kernal value of the Fourier transform to which the strip 28 corresponds. The result after bias subtraction is stored on video tape by conventional means 34. Alternatively, the output of the photomultiplier tube after bias subtraction could be displayed on a CRT as at 30 or other indicating instrument.

The Fourier transform of a picture is a special case of correlation. The Fourier transform approach is illustrated on the example of a one-dimensional sine transform of a picture of N × N resolution elements (N~1000) specified by the intensity array $g(m,n)$ $(m,n = l, \ldots, N)$, where the $m$ index numbers specify the row positions and the n index numbers specify the column positions of the individual resolution elements 31. The coefficients $G_s(m,n)$ of the Fourier transform of the intensity array g(m,n) along any given row m are defined by $$G_s(m,n) = \sum_{\gamma=1}^{N} g(m,\gamma) \sin 2\pi n\gamma/N, \; m,n = 1, 2, \ldots, N \tag{1}$$

To avoid negative terms in the summation, we introduce a processing function $$z_s^{(n)}(\gamma) = 1 + \sin 2\pi n\gamma/N \tag{2}$$

Since $z_s^{(n)}(\gamma)$ is not a function of $m$, it is the same for all the rows of the picture. Eq. (1) is then rewritten $$G_s(m,n) = \sum_{\gamma=1}^{N} g(m,\gamma) z^{(n)}(\gamma) - \sum_{\gamma=1}^{N} g(m,\gamma) \tag{3}$$

The summations are preformed optoelectronically by means of a processing plate of N strips having the successive transmittivities:

$$k z_s^{(n)}(\gamma) \; (n = N, 1, 2, \ldots, N\text{-}1), (\gamma = 1, 2, \ldots, N) \tag{4}$$

where $k < ½$ is the constant of the plate, determined by calibration. The transmittivity of the first strip is uniform since $kz_s^{(N)}(\gamma) = k$. The nth strip has the transmittivity $kz_s^{(n-l)}(\gamma)$, where $\gamma = 1, 2, \ldots, N$. The length of the strip area corresponding to any of the N values of $\gamma$ is the same as the strip width and matches the size of the resolution element of the picture being transformed. The strips may be contiguous or may be separated by opaque lines. While the making of a processing plate entails time and expense, it is a onetime operation. To perform the various summations, line m of the picture is projected successively on the N transmissive strips of the processing plate. After passing through a strip, the light is focused on a photomultiplier. In suitable units, the total amount of light through the $n+1$ strip is $$k \sum_{\gamma=1}^{N} z_s^{(n)}(\gamma) g(m,\gamma) \quad (n = N, 1, 2, \ldots, N-1). \tag{5}$$

Eq. (5) represents the correlation of row m of the picture with successive strips of the processing plate. The uniform transmission of the first strip gives the value of $$k \sum_{\gamma=1}^{N} g(m,\gamma) \; kg(m),$$

the second sum in Eq. (3). To obtain the coefficients $G_s(m,n)$ of the Fourier transform, we store $kg(m)$ which specifies the bias level and take the difference between the photomultiplier output after illumination of line $n+1$ and this stored signal. Obviously $G_s(m,n) \gtrless O$. This appears to be the only optoelectronic (i.e., non-digital) method of obtaining the sign as well as the absolute value of a coefficient in the Fourier transform of a picture, through Rosenfeld, Picture Processing by Computer by Rosenfeld, Chapter V, Academic Press 1969 discusses negative optical values at some length. A similar procedure is used to obtain the values of $G_c(m,n)$, the cosine transform coefficients. The physical implementation of the procedure described is as follows: The transparency is illuminated one resolution line at a time. The luminescent image, a line, is positioned successively in front of the N strips of the processing plate by the magnetic deflection system. Each placement requires no more than 0.1 μsec, but to minimize errors due to phosphor persistence, 0.17 μsec, the time interval for decay of fast phospher P47 to 1% may be used. Opaque strips on the processing plate meant to improve the separation of the photomultiplier input signals may be superfluous at the lower speed.

A line of 1000 elements is transformed within 170 μsec since 6 Fourier coefficients per microsecond can be obtained (with a P47 phospher screen). Thus the one-dimensional transform of a 1000 × 1000 pixels requires less than 0.2 sec. Parallel processing eliminates the need for Cooley-Tukey type algorithms. However, the sequential character of the output of the one-dimensional transform precludes further parallel processing, i.e., the method cannot be extended to a two-dimensional transform. If the frequency distribution in Fourier space is expected not to be random as to direction e.g., a picture consisting of black and white strips running in one direction, two one-dimensional transform should be performed at right angles to each other to provide the necessary frequency information. Since the second transform uses the same picture as the first, the total time is less than 0.4 sec.

Figure 2:
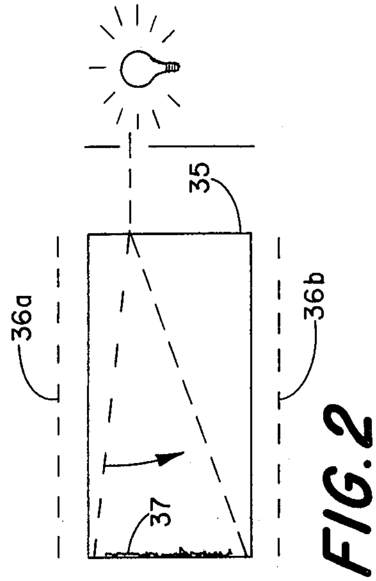
Figure 4:
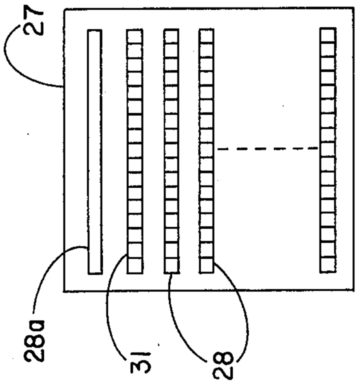
Figure 3:
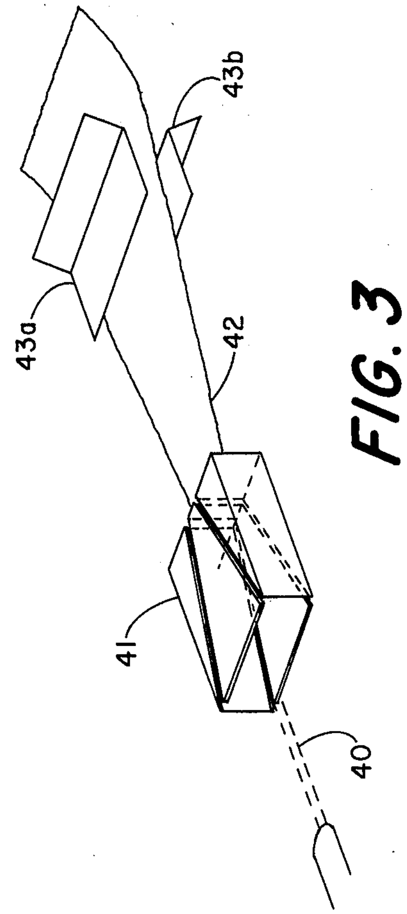

It remains to specify the means of illuminating the transparency, one line at a time, the line illumination being maintained for about 170 μsec. This high speed precludes the use of optomechanical techniques. The requirements are also not consistent with the parameters of direct view storage tubes. The following three implementations are not available as off-the-shelf items but are state-of-the-art and can be obtained commercially by special order. They appear practical and should be evaluated for use in a particular case:

a. The image of a brightly illuminated slit as shown in FIG. 2 is formed on the output screen 37 of an image converter tube 35 and deflected from one position to the next at the desired rate of speed by a magnetic deflection coil 36a and 36b. While no conventional photocathode provides, without rapid deterioration, the beam current needed to generate an adequate luminous source, a metal photocathode 37, though operating at lower efficiency, can with suitable cooling, emit a sufficiently intense electron beam. Since the line remains at a fixed position for only 170 μsec before being shifted, adequate line intensity can be provided without danger of phosphor burn. Such tubes are fully state-of-the-art, but are not in production.
b. A bright line is written very rapidly on the screen of a CRT 39 as shown in FIG. 2. Tubes with writing rates in excess of $3 \times 10^4$ cm/μsec for an unmodulated beam were manufactured by Du Mont Cathode Ray Tube Types KC 2427p as far back as 1956. A different deflection system, which gives a similar result, was incorporated in a tube built in Japan in 1962. Such a deflection system is known in the prior art and is described, for example, in U.S. Pat. No. 3,720,859 issued Mar. 13, 1973 to R. H. Hilden. Even at a writing speed 10 times slower, a line 3 cm long is scanned nearly 200 times during the "computation" of one Fourier coefficient, thus insuring uniform luminescence. This luminous line is placed in successive positions by conventional CRT deflection plates **38*a* and 38*b*.**
c. A line-focus electron beam, which generates a uniformly luminescent line rather than a spot on a CRT screen, provides the most direct approach. No complete tube with this gun has been manufactured as yet, but R. Kalibjian (IEEE Proc. 60, 244 (1972) has designed and built an electron gun for this purpose as illustrated in FIG. 3. By deflecting the line-focus electron gun with digital mode deflection plates as desribed in the above-identified Hilden patent the desired line-by-line scanning is obtained.

The above described embodiment is representative of the invention and modifications within the scope of the invention will occur to those skilled in the art. Variations in the form of the information processed can be made, phosphor coatings of the image converter tube having faster writing rates and commensurate deflection rates for the line of light source scanning the information as improved equipment is developed and as practical need for integral transforms other than the Fourier transform may be employed.

In another embodiment, one line of information may be available sequentially from telemetered date or computer output. In that case the combination of illuminating source, transparency and image converter tube is replaced by a line display on a cathode ray tube which is scanned to be placed in front of the successive strips of the transmissive plate. Sequential input slows down processing but for one line of input the time is not excessive for practical applications such as transformation of one-dimensional filter functions. Technique may be used but is not recommended for multilipe sequential inputs because of length of time involved.

I claim:

1. A method for rapidly processing substantially parallely arranged pictorial information comprising:

a. illuminating line by line said pictorial information and applying the light intensity output from said illuminated line of information to optoelectronic means;

b. scanning the output of said optoelectronic means across a transmissive plate having a first strip of uniform density and succeeding parallely arranged strips with adjacent elemental areas of relative variable density, the transmittivity of said elemental areas of said strips corresponding to the kernel values of an integral transform;

c. applying the total amount of light output of each of said scanned parallely arranged strips of said transmissive plate sequentially to a photomultiplier tube and storing the output signal corresponding to the total amount of light output of said first strip; and d. subtracting the photomultiplier tube output after illumination of a line of the transmissive plate from the stored signal of said first strip to determine the transform coefficients of said integral transform of the pictorial of said transparency.

2. A method as recited in claim 1 wherein said optoelectronic means is an image converter tube and said scanning of the output of said optoelectronic means is performed by a magnetic deflection coil energized by an electronic step signal of increasing voltage.

3. A method for rapidly processing pictorial information of a transparency comprising:

a. illuminating said transparency with a line of light source;

b. deflecting said line of light source for successive line scanning of pictorial information on said transparency and applying the light intensity output of each successive line of said scanned pictorial information to optoelectronic means having a light transmissive plate adjacent the output of said optoelectronic means, said transmissive plate with a first strip of uniform density and succeeding parallely arranged strips with adjacent elemental areas of relative variable transmittivity corresponding to kernel values of an integral transform;

c. projecting said deflected line of light source illuminating said transparency through a line of pictorial information on said transparency and successively scanning through said optoelectronic means all parallely arranged strips on said transmissive plate with each line of pictorial information;

d. applying the total amount of light output of each of said scanned lines on said transmissive plate to a photomultiplier tube and storing the output signal corresponding to the total amount of light output of said first strip;

e. subtracting the photomultiplier tube output after illumination of a line of said transmissive plate from the stored signal of said first strip for each line of said transparency to determine the transform coefficients of said integral transform of the pictorial information of said transparency; and f. storing the signal.

4. A method as recited in claim 3 wherein said optoelectronic means is an image converter tube and said scanning of the output of said optoelectric means is performed by a magnetic deflection coil energized by an electronic step signal of increasing voltage.

5. Apparatus for rapidly processing pictorial information comprising:

a. a source of substantially parallely arranged pictorial information illuminated one line at a time;

b. optoelectronic means including electronic line by line scanning means receiving light intensity output from said source of substantially parallely arranged pictorial information;

c. a light transmissive plate in contiguous relation with the output face of said optoelectronic means, said plate having parallely arranged strips, a first strip having a density of the material of said plate and succeeding strips having adjacent elemental areas of relative variable transmittivities corresponding to kernel values of an integral transform;

d. photomultiplier means adjacent said light transmissive plate receiving the total light output of said transmissive plate upon line by line scanning of said information; and e. said line by line electronic scanning means successively sweeping the information of said illuminated line received from said optoelectronic means over said parallely arranged strips with the total amount of light transmitted through each strip of said transmissive plate received by said photomultiplier means and the output thereof stored electronically whereby the transform coefficients of said integral transform are determined by the difference between the output of said photomultiplier means after illumination of a line of said transmissive plate and a stored bias signal.

6. Apparatus as recited in claim 5 wherein said optoelectronic means is an image converter tube and said line by line scanning means is a magnetic deflection coil energized by an electronic step signal of increasing voltage.

7. Apparatus for rapidly processing pictorial information comprising:

a. a transparency containing parallely aligned pictorial information;

b. a line of light source aligned with said transparency for illuminating individual lines thereof;

c. first and second electronic deflection means for successively scanning parallel lines of pictorial information;

d. optoelectronic means aligned with said scanning line of light source and said transparency, said transparency in contiguous relation with the input face of said optoelectronic means;

e. a light transmissive plate in contiguous relation with the output face of said optoelectronic means, said plate having parallely arranged strips parallel to line of light source, a first strip having a density of the material of said plate and succeeding strips having adjacent elemental areas of relative variable transmittivities corresponding to kernel values of an integral transform;

f. photomultiplier means adjacent said light transmissive plate receiving the total light output of strips of said transmissive plate upon line by line scanning of the pictorial information on said transparency; and g. said first electronic deflection means connected to said line of light source for illuminating a line of pictorial information on said transparency, imparting the light passing through said line of pictorial information on said transparency to the input face of said optoelectronic means and said second electronic deflection means successively sweeping the output of said optoelectronic means over said parallely arranged strips with the total amount of light transmitted through each strip of said transmissive plate received by said photomultiplier means and the output thereof electronically stored whereby the transform coefficients of said integral transform are determined by the difference between the output of said photomultiplier means after illumination of a line of said transmissive plate and a stored bias signal.

8. Apparatus as recited in claim 7 wherein said optoelectronic means is an image converter tube and said second electronic deflection means is a magnetic deflection coil energized by an electronic step signal of increasing voltage.

9. A method for determining transform coefficients of an integral transform in rapid processing of a line of substantially parallely arranged, incoherently illuminated pictorial information comprising:

a. applying the intensity of illumination from the illuminated line of pictorial information to the input face of an optoelectronic means;
b. scanning the output of said optoelectronic means over a light transmissive plate continuous to the output face of said optoelectronic means, said transmissive plate having a first strip of uniform density and succeeding parallely arranged strips with adjacent elemental areas of relative variable transmittivity corresponding to kernel values of an integral transform;
c. applying the total amount of light output of each of said scanned lines on said transmissive plate to a photomultiplier tube; and
e. subtracting the photomultiplier tube output after illumination of a line of said transmissive plate from a stored bias signal obtained from the photomultiplier tube output after illumination of said first strip of uniform density.

10. The method of claim 9 wherein densities on said strips correspond selectively to kernel values of Fourier, Laplace, Mellin and other Hankel integral transforms.

11. A method as recited in claim 9 wherein said optoelectronic means is an image converter tube and said successive scanning on said transmissive plate is performed by a magnetic deflection coil energized by an electronic step signal of increasing voltage.

12. A method as recited in claim 9 wherein said pictorial information is displayed on a transparency.

13. An apparatus for processing a line of pictorial information into the coefficients of a transform representing the intensity of the line comprising:

a. a transmissive plate with parallely arranged strips having a first strip of uniform density and succeeding parallel strips with adjacent elemental areas of relative variable transmittivity corresponding to kernel values of the integral transform;
b. an image converter means with magnetic deflection means for imparting the line of pictorial information successively to each strip of said transmissive plate; and
c. photomultiplier means adjacent said light transmissive plate receiving the total light output of said strips of said transmissive plate whereby the transform coefficients of said integral transform are determined by the difference between the output of said photomultiplier means after illumination of a line of said transmissive plate and said first line of said transmissive plate.

14. A transmissive plate for use in a system for rapidly processing pictorial information utilizing transform coefficients of an integral transform, said transmissive plate comprising a plurality of horizontally disposed strips, a first one of said plurality of strips having a density of the material of said plate and succeeding parallely arranged strips having adjacent elemental areas of relative variable transmittivities corresponding to kernel values of an integral transform.

* * * * *